(12) United States Patent
Barton (10) Patent No.: US 11,590,470 B2
(45) Date of Patent: Feb. 28, 2023

(54) LIQUID PROCESS ASSEMBLY

(71) Applicant: NiTech Solutions Limited, Edinburgh (GB)

(72) Inventor: Alastair William Barton, Stroke-on-Trent (GB)

(73) Assignee: NiTech Solutions Limited, Edinburgh (GB)

( * ) Notice: Subject to any disclaimer, the term of this patent is extended or adjusted under 35 U.S.C. 154(b) by 0 days.

(21) Appl. No.: 17/259,239

(22) PCT Filed: Jul. 12, 2019

(86) PCT No.: PCT/GB2019/051960
§ 371 (c)(1),
(2) Date: Jan. 11, 2021

(87) PCT Pub. No.: WO2020/012192
PCT Pub. Date: Jan. 16, 2020

(65) Prior Publication Data
US 2021/0260548 A1    Aug. 26, 2021

(30) Foreign Application Priority Data

Jul. 12, 2018 (GB) .................................... 1811402

(51) Int. Cl.
*B01J 19/24* (2006.01)
*B01J 4/00* (2006.01)
(Continued)

(52) U.S. Cl.
CPC ............ *B01J 4/008* (2013.01); *B01D 9/0068* (2013.01); *B01J 19/006* (2013.01); *B01J 19/2425* (2013.01); *B01J 19/2435* (2013.01); *B01J 2219/0027* (2013.01); *B01J 2219/00033* (2013.01); *B01J 2219/00065* (2013.01); *B01J 2219/00067* (2013.01); *B01J 2219/00252* (2013.01); *B01J 2219/00765* (2013.01); *B01J 2219/2418* (2013.01)

(58) Field of Classification Search
CPC ...... B01J 4/008; B01J 19/006; B01J 19/2415; B01J 19/2425; B01J 19/2435; B01J 19/241; B01J 2219/00033; B01J 2219/00065; B01J 2219/00067; B01J 2219/00252; B01J 2219/0027; B01J 2219/00765; B01J 2219/2418
See application file for complete search history.

(56) References Cited

U.S. PATENT DOCUMENTS 5,707,868 A * 1/1998 Boulay .................. C12M 25/16
435/383
6,179,912 B1 1/2001 Barbera-Guillem
(Continued)

FOREIGN PATENT DOCUMENTS

EP  0029701  6/1981
EP  1076597  2/2001
(Continued)

*Primary Examiner* — Lessanework Seifu
(74) *Attorney, Agent, or Firm* — Dorton & Willis LLP; Ryan Willis (57) ABSTRACT

A liquid process assembly, the assembly including a length of pipework, and a reversible pump for selectively reciprocally moving liquid through the pipework.

21 Claims, 8 Drawing Sheets

(51) Int. Cl.
 *B01D 9/00* (2006.01)
 *B01J 19/00* (2006.01)

(56) References Cited

U.S. PATENT DOCUMENTS

| | | | | |
|---|---|---|---|---|
| 6,758,593 | B1* | 7/2004 | Terentiev | A61M 60/871 |
| | | | | 417/420 |
| 7,950,547 | B2* | 5/2011 | Saunders | B67D 1/0804 |
| | | | | 222/64 |
| 2014/0328731 | A1 | 11/2014 | Ni | |
| 2015/0273430 | A1* | 10/2015 | Roelands | B01J 19/1831 |
| | | | | 366/341 |
| 2015/0305746 | A1* | 10/2015 | Johnson | A61B 17/12045 |
| | | | | 606/153 |
| 2017/0233327 | A1* | 8/2017 | Johannsen | B01J 4/007 |
| | | | | 549/505 |
| 2018/0304227 | A1* | 10/2018 | Blum | B01J 19/241 |

FOREIGN PATENT DOCUMENTS

| | | |
|---|---|---|
| WO | 2013/050764 | 4/2013 |
| WO | PCT/GB2019/51960 | 10/2019 |
| WO | PCT/GB2019/51960 | 1/2020 |

\* cited by examiner

LIQUID PROCESS ASSEMBLY

This application is a national stage of PCT/GB2019/051960, filed Jul. 12, 2019, which claimed priority to Great Britain patent application number 1811402.5, filed Jul. 12, 2018, all of which are incorporated herein by reference.

FIELD OF THE INVENTION

This invention concerns liquid process assemblies, and particularly continuous reactors and crystallisers, methods of carrying out a liquid process, and a method of cleaning a liquid process assembly.

BACKGROUND TO THE INVENTION

Liquid process assemblies are used in a wide range of applications, for instance in continuous reactions, semi continuous reactions, and crystallisations to for instance provide a purified product. In such assemblies it can often be beneficial or required to provide turbulence in the liquid.

When cleaning such liquid process assemblies it is conventional to flush or pump a significant quantity of cleaning liquid therethrough. This therefore requires a significant quantity of cleaning liquid, and also produces a significant amount of used cleaning liquid for disposal.

According to a first aspect of the invention there is provided a liquid process assembly, the assembly including a length of pipework, and a reversible pump for selectively reciprocally moving liquid through the pipework.

The term liquid process used in the present application should be considered to include continuous reactions, semi continuous reactions, crystallisations, continuous crystallisations, and chemical continuous reactions.

The length of pipework may be a tubular device. The length of pipework may be a continuous tubular device.

The assembly may process liquid, liquid mixtures, a liquid-liquid mixture, a liquid-solids mixture, a liquid-solids-gas mixture, or a liquid-gas mixture. The assembly may process fluids. The fluid may be a liquid-solids-gas mixture, or a liquid-gas mixture.

The reversible pump may be a positive displacement replacement pump.

The reversible pump may be a fluid oscillation device. The reversible pump may be operable to oscillate fluids in the assembly.

The reversible pump may be operable to impart oscillatory motion to the assembly. The reversible pump may be operable to impart oscillatory motion to the liquid in the assembly.

The assembly may include a vessel for liquid connected to the pipework. The vessel may be located on an opposite side of the positive displacement pump to at least the majority of the pipework.

The vessel may be in the form of a feed vessel. The vessel may be in the form of a feed vessel, and more than one feed vessel may be provided.

The positive displacement pump may be a rotary pump. The positive displacement pump may be a rotary pump, and may be a lobe or gear pump.

The positive displacement pump may be controlled by a servo motor.

The positive displacement pump may have a magnetic drive located on the exterior of the pump.

The assembly may include a plurality of vessels. Each vessel may be configured to operate with a positive displacement pump. Each pump may include a controller. The controller being configured to reciprocate flow through the pump. A greater flow may be directed away from the vessels such that liquid passes through the assembly and out of the far end of the pipework. The pumps may operate at different pumping volumes. One pump may oscillate/reciprocate its flow and another pump may not oscillate/reciprocate its flow.

The frequency of reciprocal movement of the positive displacement pump may be not greater than 10 Hz, particularly 6 Hz and especially 3 Hz, but may be greater than 1 Hz.

The assembly may include a pressure absorption arrangement/accumulator. The pressure absorption arrangement/accumulator may include a closed container with gas trapped therein; may include a diaphragm; or may include a gas filled resilient member.

The positive displacement pump may include a controller. The controller may be configured such that the reciprocal movement thereof may be selectively biased to pump to a greater extent in one direction than in an opposite direction.

One or more liquid level sensors may be provided in the assembly. One or more liquid level sensors may be provided in the assembly, and the liquid level sensor or sensors may be connected to the controller such that the reciprocal movement of the positive displacement pump can be varied in response to the detected liquid levels.

The liquid level sensors may be provided on the vessel.

One or more pressure sensors may be provided in the assembly. One or more pressure sensors may be provided in the assembly, and the pressure sensor or sensors may be connected to the controller such that the reciprocal movement of the positive displacement pump can be varied in response to the detected pressure levels.

The pressure sensor or sensors may be provided on the vessel.

The assembly may be arranged such that it can be selectively pressurised. The assembly may be arranged such that it can be pressurised.

One or more level devices may be provided in the assembly. The one or more level devices may be configured to detect changes in the liquid level.

The assembly could be in the form of a chemical continuous reactor. The assembly may be in the form of a chemical continuous reactor.

The assembly could be in the form of a crystalliser. The assembly may be in the form of a crystalliser.

The vessel may include an impellor to substantially prevent crystallisation or settling out within the vessel.

The vessel may be a feed vessel. The vessel may be a feed vessel, and may include an inlet for process liquid.

An inlet may be provided downstream of the vessel. The inlet may be connected to a feed pump. The feed pump may be connected to a feed supply of material.

The vessel may include a vent. The vent may be located on an opposite side to the inlet.

An inlet may be provided upstream of the vessel. The inlet may be connected to a feed pump. The feed pump may be connected to a feed supply of material.

The pipework and vessel may be configured such that a substantially equal upper liquid level is provided in each. The pipework and accumulator vessel may be vertically configured at least generally adjacent each other. The end of the pipework may be closed. The end of the pipework may be closed, and a pressure relief valve may be provided on the end of the pipework.

The pipework may be in the form of a closed circular loop.

The pipework may include two or more circular loops. The two or more loops may be adjacent one another. The two or more circular loops being joined, such that liquid may flow therethrough.

According to a further aspect of the invention there is provided a method of carrying out a liquid process, the method including using an assembly according to any of the preceding paragraphs, and reciprocally moving the liquid in the pipework.

The reciprocal pumping of the liquid may be selectively biased to be greater in a direction away from an inlet, such that a continuous process is carried out, with additional liquid being supplied into the accumulator vessel.

The assembly may be configured such that in response to signals from the one or more liquid level sensors, the pumping is biased in either direction so as to provide a required liquid level in the assembly either side of the positive displacement pump.

The process may be carried out at an elevated pressure.

The liquid process may be a continuous reaction.

The liquid process may be a crystallisation.

Embodiments of this further aspect of the present invention may include one or more features of the first aspect of the present invention or its embodiments.

According to a still further aspect of the invention there is provided a method of cleaning a liquid process assembly according to any of the preceding paragraphs, the method comprising reciprocally moving cleaning liquid through the pipework by reciprocal pumping thereof.

Embodiments of this further aspect of the present invention may include one or more features of the previous aspects of the present invention or their embodiments.

The invention further provides apparatus for cleaning a liquid process assembly, the apparatus including a positive displacement pump for selectively reciprocally moving cleaning liquid through the pipework.

The apparatus may be selectively connectable to a liquid process assembly when cleaning is required.

The apparatus may include a length of pipework selectively connectable across a part of the liquid process assembly, with the positive displacement pump part way along the length of pipework.

A reservoir may be provided part way along the length of pipework.

Embodiments of this further aspect of the present invention may include one or more features of the previous aspects of the present invention or their embodiments.

According to a further aspect of the invention there is provided a fluid process assembly, the assembly including a length of pipework, and a fluid oscillation apparatus for selectively reciprocally moving liquid through the pipework.

The term fluid process used in the present application should be considered to include continuous reactions, semi continuous reactions, crystallisations, continuous crystallisations, and chemical continuous reactions.

The length of pipework may be a tubular device. The length of pipework may be a continuous tubular device.

The assembly may process liquid, liquid mixtures, a liquid-liquid mixture, a liquid-solids mixture, a liquid-solids-gas mixture, or a liquid-gas mixture.

The fluid oscillation apparatus may be a fluid oscillation generator, or device. The fluid oscillation apparatus may be operable to generate fluid oscillations in the length of pipework. The fluid oscillation apparatus may be operable to generate reciprocal movement of fluid in the length of pipework. The fluid oscillation apparatus may be a reversible pump.

Embodiments of this further aspect of the present invention may include one or more features of the previous aspects of the present invention or their embodiments.

According to a further aspect of the invention there is provided a fluid oscillation assembly, the assembly including a length of pipework, and a reversible pump for selectively reciprocally moving liquid through the pipework.

Embodiments of this further aspect of the present invention may include one or more features of the previous aspects of the present invention or their embodiments.

According to a further aspect of the invention there is provided a fluid assembly, the assembly including a length of pipework, and a reversible pump for selectively reciprocally moving liquid through the pipework.

Embodiments of this further aspect of the present invention may include one or more features of the previous aspects of the present invention or their embodiments.

According to a further aspect of the invention there is provided an oscillation assembly, the assembly including a length of pipework, and a reversible pump for selectively reciprocally moving liquid through the pipework.

Embodiments of this further aspect of the present invention may include one or more features of the previous aspects of the present invention or their embodiments.

BRIEF DESCRIPTION OF THE DRAWINGS

Figure 1:
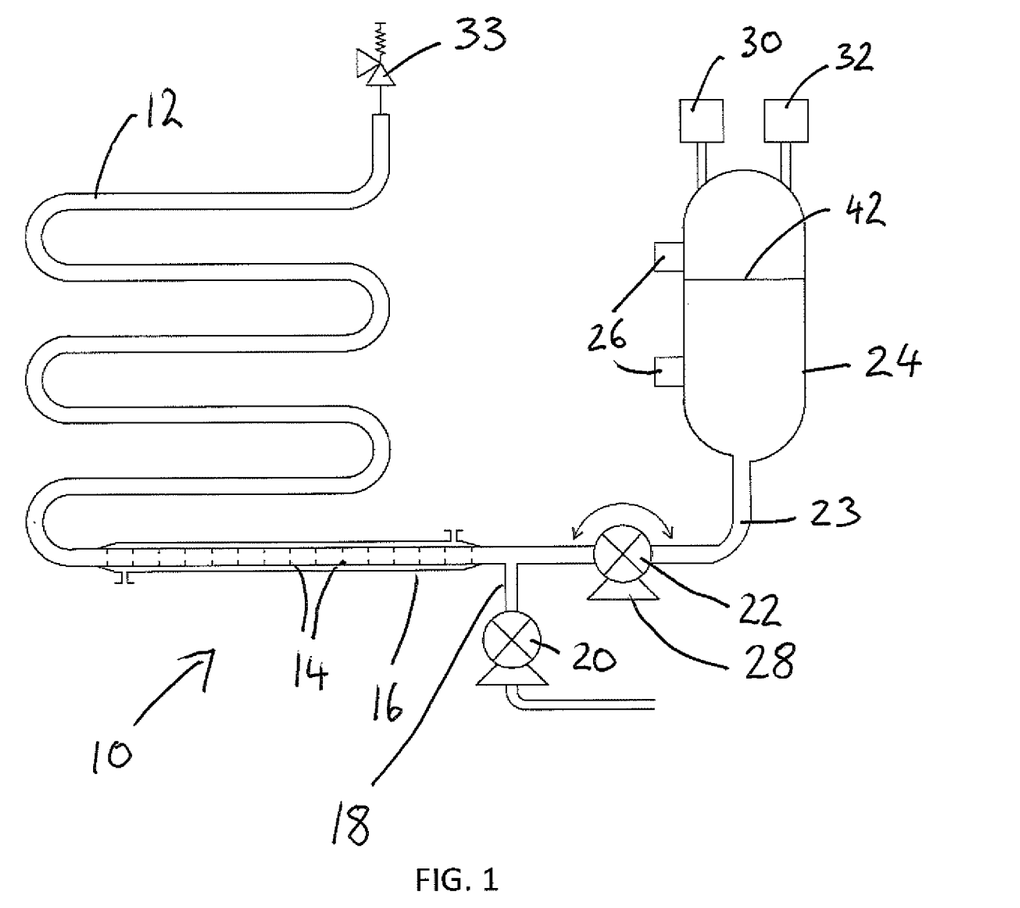
FIG. 1 is a diagrammatic side view of a first liquid process assembly according to the invention.

FIG. 1 shows a first liquid process assembly 10 usable for instance in a chemical continuous reaction. The liquid process assembly 10 may be used to carry out continuous reactions, semi continuous reactions, crystallisations, continuous crystallisations, and chemical continuous reactions.

The assembly 10 may process fluids, including liquids, liquid mixtures, a liquid-liquid mixture, a liquid-solids mixture, a liquid-solids-gas mixture, or a liquid-gas mixture.

The first assembly 10 includes a reactor vessel in the form of a length of pipework 12 (a tubular device/continuous tubular device) profiled in the form of two flattened S shapes located one above each other. A plurality of baffles 14 are shown diagrammatically in part of the pipework 12. The baffles 14 help to cause mixing and turbulence in liquid in the pipework 12. A jacket 16 is also shown around part of the pipework 12, and it is to be realised that such a jacket 16 could be provided for any part of the pipework 12, and could be provided for the whole length of the pipework 12. The jacket 16 can be used to maintain a required temperature in the pipework 12.

Immediately to the right of the jacket 16 as shown in FIG. 1 along the pipework 12, an inlet 18 is provided which leads from a feed pump 20, which pump 20 will connect to a feed supply (not shown) of material. To the right of the inlet 18 a positive displacement pump 22 is provided. A pipe 23 on the opposite side of the pump 22 connects to a vessel 24 which is partly filled with the liquid material. A pair of spaced liquid level sensors 26 are provided on the side of the vessel 24, which connect to a controller 28 for the pump 22.

At the upper end of the vessel 24 a pressure sensor 30 is provided. This can detect the pressure change as the liquid moves reciprocally, and is connected to a controller 28 that can be used to control the pump 22 dependent on the pressure measured. A level device 32 is also provided to detect the changes in the liquid level.

A back pressure relief valve 33 is provided on the opposite end of the pipework 12 to the vessel 24.

Figure 3:
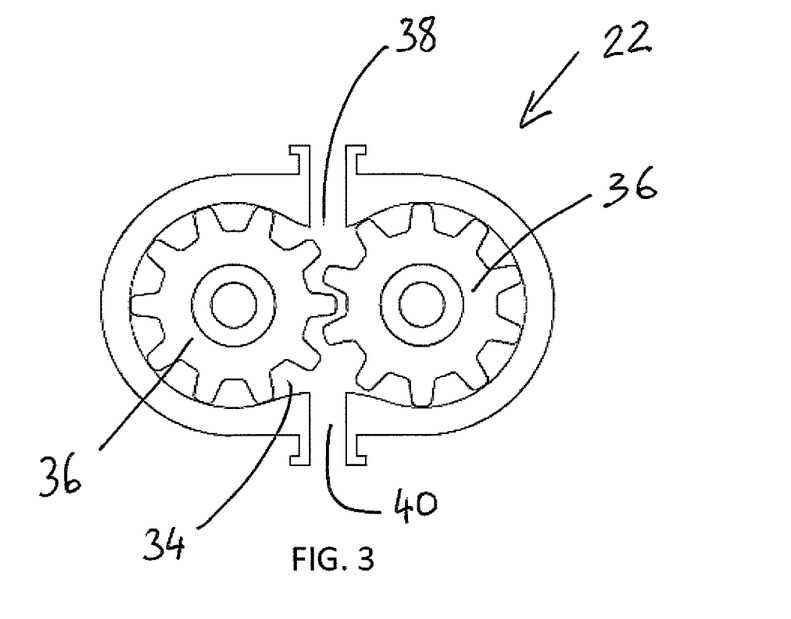
FIG. 3 is a diagrammatic cross-sectional side view of a first positive displacement pump, usable in assemblies according to the invention.

As described further below, the reversible pump (fluid oscillation device/generator) may be operable to oscillate fluids in the assembly 10. The pump 22 is in the form of a positive displacement rotary gear pump as shown in FIG. 3. The pump 22 comprises a chamber 34, which in cross section is in the form of two interconnecting circles, each locating a gear 36 with only a small space between the teeth on the gears 36 and the walls of the chamber 34. The gears 36 intermesh so that they will rotate in opposite directions. A servo motor is provided in the controller 28, which provides for quick changing between the direction of pumping, and for the pump to reach maximum pumping speed very rapidly.

An inlet 38 is provided into the chamber 34 adjacent the interconnection of the two circles in the chamber profile, with an outlet 40 from the chamber 34 of an opposite side of the chamber 34. A contactless magnetic drive, driven by the servo motor selectively rotates a one of the gears 36, which will drive the other gear 36 in an opposite direction. As the magnetic drive is contactless no seal is required between the drive and the respective gear 36, thereby preventing a leakage therebetween which would otherwise inevitably occur to at least some degree over time.

In use the pipework 12 and vessel 24 are at least partially filled with liquid pumped by the feed pump 20 through the inlet 18 once the assembly 10 is filled, the positive displacement pump 22 is operated to provide sequential forward and reverse pumping, reciprocally moving liquid into and out of the pipework 12 causing turbulence therein and an improved reaction.

The frequency of reciprocal movement of the positive displacement pump 22 may be not greater than 10 Hz, particularly 6 Hz and especially 3 Hz, but may be greater than 1 Hz. However, it should be appreciated that other suitable frequencies may be used.

The liquid level sensors 26 detect the liquid level 42 in the vessel 24, and if it is detected that this has gone above, or gone below pre-set required heights, then the bias of the sequential forward and reversing of the pump 22 can be amended to respectively pump a greater volume of liquid into or out of the vessel 24.

The reaction can be carried out on a continuous basis, with reacted liquid periodically or continuously exiting through the far end of the pipework 12. When it is required to clean the assembly 10, reaction liquid could be pumped thereoutof and a cleaning solvent or other liquid could be fed into the assembly 10 and reciprocally moved by the positive displacement pump 22 to cause cleaning. Once cleaning has been completed the used cleaning liquid can be pumped out of the assembly 10. Using the cleaning liquid with the reciprocal movement avoids using large quantities of cleaning liquid which would otherwise be the case if the cleaning liquid is simply flushed or pumped through an assembly 10.

Figure 2:
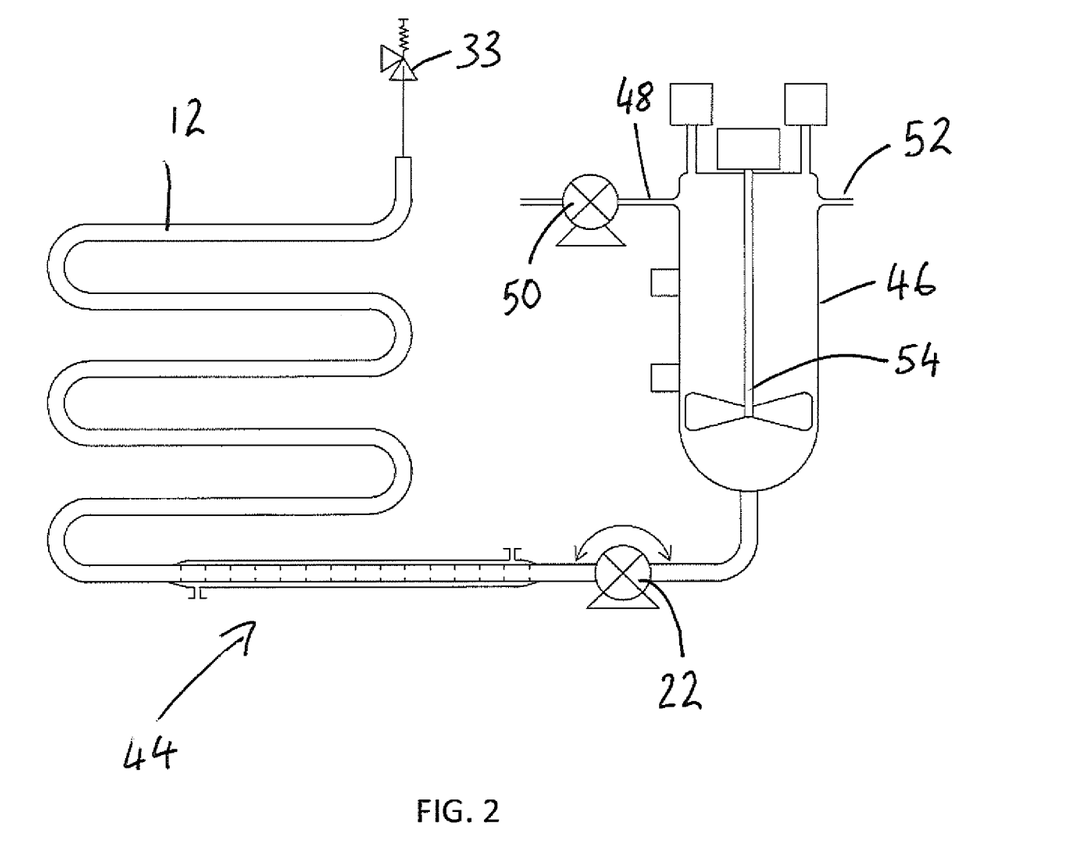
FIG. 2 is a similar view to FIG. 1 but of a second liquid process assembly according to the invention.

FIG. 2 shows a further liquid process assembly 44 usable for instance for crystallisation to purify a product. The assembly 44 is similar to the assembly 10 except as will be thereinafter described. In this instance the vessel 46 is in the form of a feed vessel with an upper inlet 48 with a feed pump 50. The feed vessel 46 has a vent 52 on an opposite side to the feed inlet 48. An impellor 54 is provided in the feed vessel 46 to substantially prevent crystallisation or settling out therein.

The assembly 44 may operate in a similar manner to the first assembly 10. The positive displacement pump 22 is biased to pump material away from the feed vessel 46, with the assembly 44 being topped up or continuously fed with material through the inlet 48 to maintain the level in the feed vessel 46, as material passes out of the far end of the pipework 12.

Figure 4:
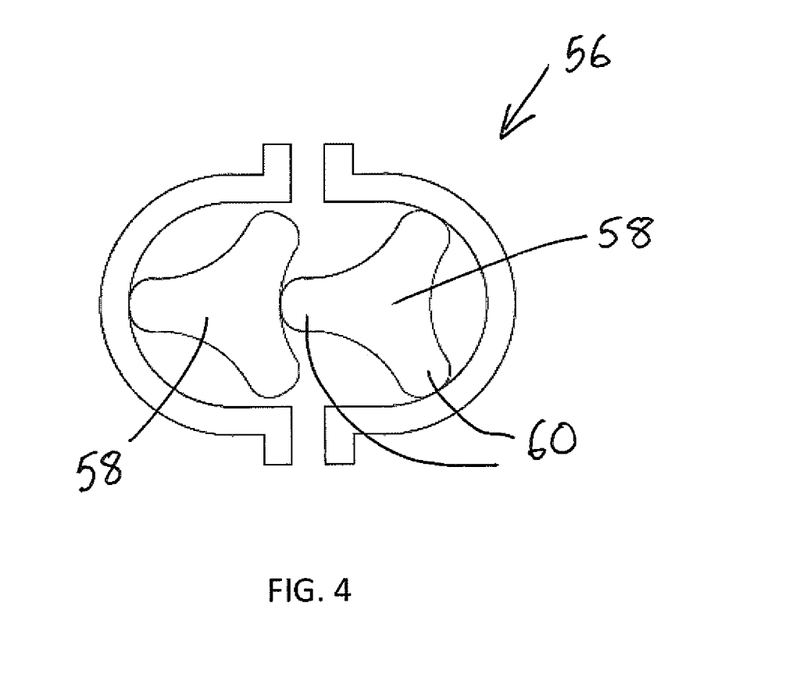
FIG. 4 is a similar view to FIG. 2 but of a second positive displacement pump usable in assemblies according to the invention.

FIG. 4 shows an alternative pump 56 which is generally similar to the gear pump/positive displacement pump 22 except that rather than gears 36 a pair of rotors 58 each with three lobes 60 thereon are provided which intermesh as shown and operate in a similar manner to the gear pump/zo positive displacement pump 22.

Figure 5:
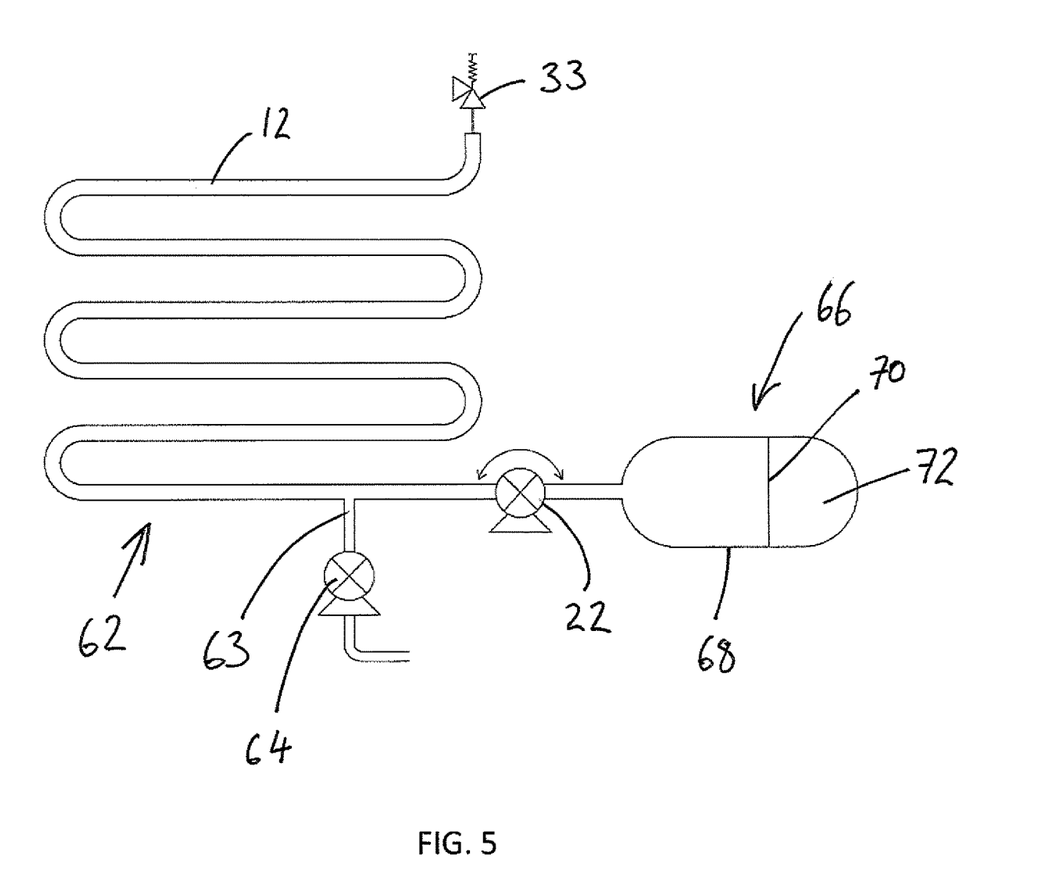
FIG. 5 is a similar view to FIG. 1 but of a third liquid process assembly according to the invention.

FIG. 5 shows a third assembly 62 with similar pipework 12 to the assembly 10. In this instance a feed inlet 63 with a feed pump 64, is provided in the pipework 12 to the left of the positive displacement pump 22.

An accumulator 66 is provided on the opposite side of the positive displacement pump 22 to the feed inlet 62, and the accumulator 66 is in the form of a closed vessel 68 with a diaphragm 70 extending thereacross. Gas 72 is provided on the opposite side of the diaphragm 70 to the pump 22.

In use as liquid is pumped into or out of the accumulator 66 this will cause the diaphragm 70 to flex in opposite directions. The gas 72 in the accumulator 66 is provided at a mean process pressure, and helps to absorb the changes in pressure caused by the changing of volume of liquid in the accumulator 66.

Figure 6:
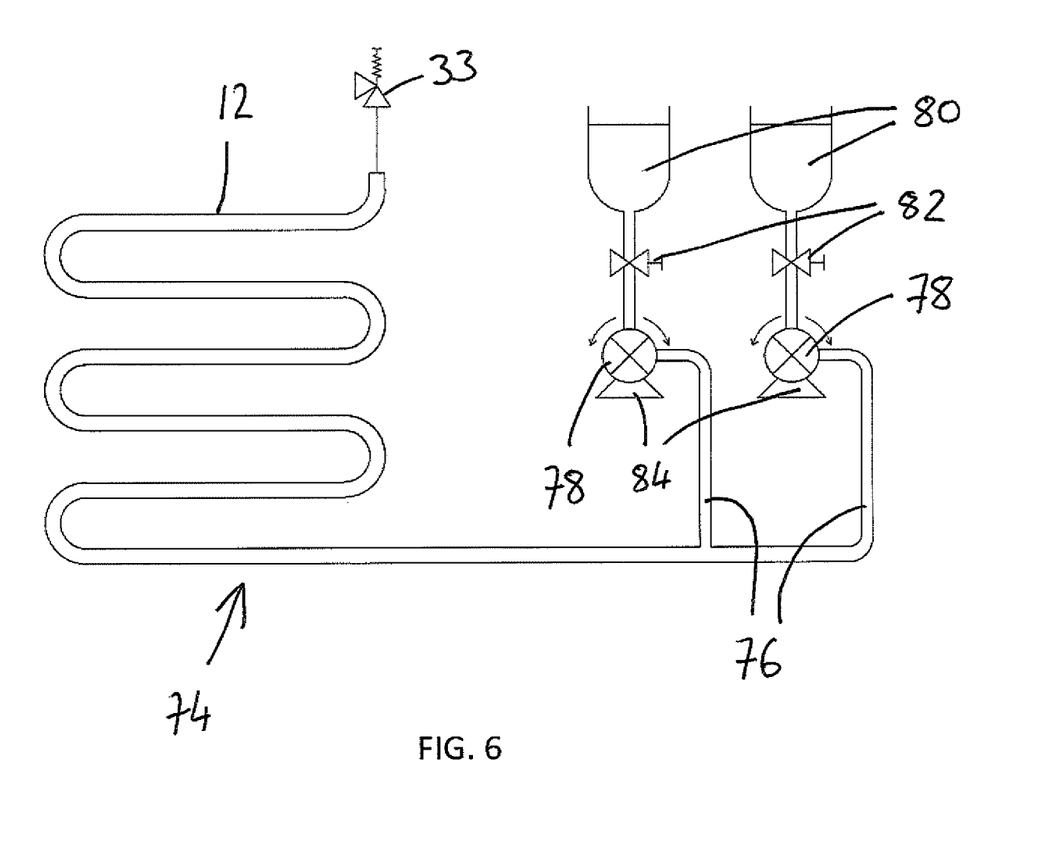
FIG. 6 is a similar view to FIG. 1 but of a fourth liquid process assembly according to the invention.

FIG. 6 shows a fourth assembly 74 with pipework 12 with a pair of inlet branches 76 extending thereinto. Each inlet branch 76 leads to a respective positive displacement pump 78. Provided above as shown in FIG. 6, for each of the pumps 78 there is a respective feed vessel 80, filled with liquid with a shut off valve 82 provided between the respective pump 78 and vessel 80.

Controllers 84 respective in each of the pumps 78 are arranged to reciprocate flow through the pump 78, but with a greater flow away from the vessels 80 such that liquid passes through the assembly 74 and out of the far end of the pipework 12. The pumps 78 may operate at different pumping volumes to provide a required ratio mixing of the materials in the respective feed vessels 80. In some instances only one of the pumps 78 need oscillate, whilst the other could just feed liquid into the assembly 74. Obviously if it is required to mix more than two materials a further branch with a further pump and feed vessel could be provided.

Figure 7:
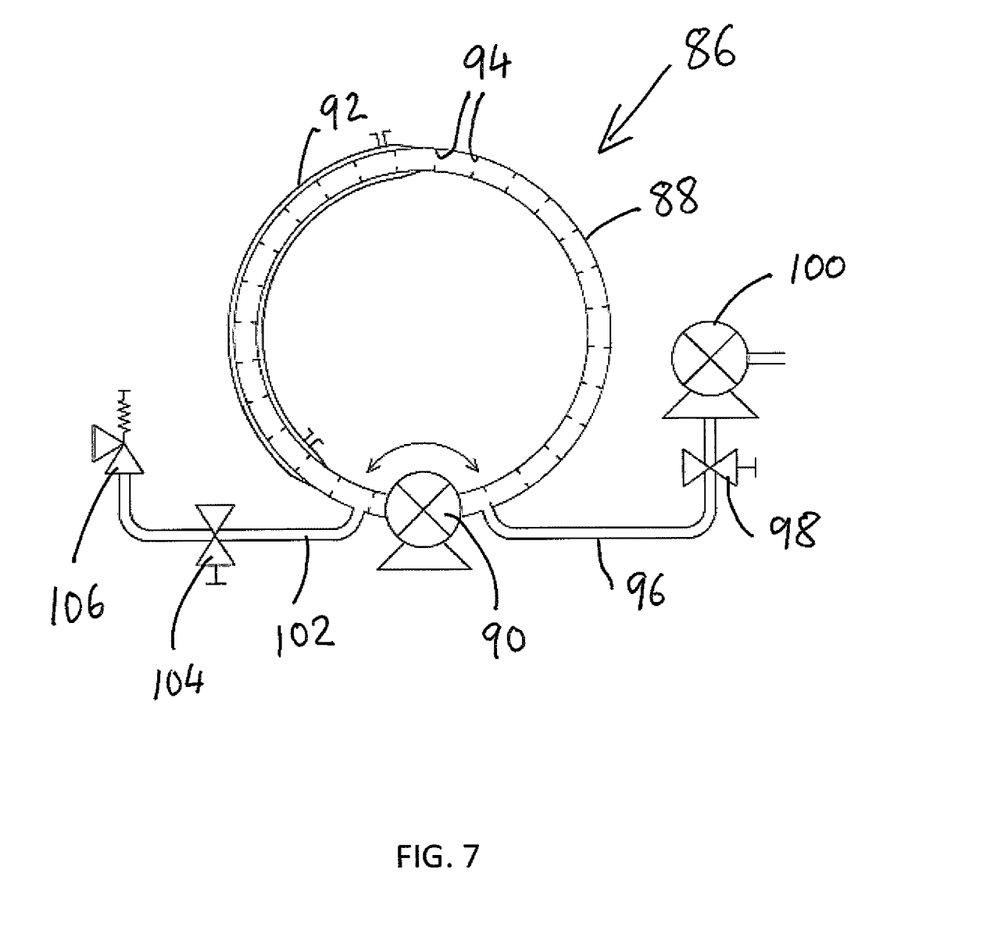
FIG. 7 is a similar view to FIG. 1 but of a fifth liquid process assembly according to the invention.

FIG. 7 shows a fifth assembly 86 which can be used for batch processing. In this instance the pipework is in the form of a closed circular loop 88, with a positive displacement pump 90 for reciprocally pumping liquid through the loop 88. The loop again has a jacket 92 and baffles 94.

An inlet pipe 96 is provided on one side of the pump 90 which connects via a valve 98 to an inlet pump 100 connected to a liquid supply. On the opposite side of the positive displacement pump 90 an outlet pipe 102 is provided leading to a valve 104 and also a back pressure relief valve 106, to permit the loop 88 to be emptied by pumping of the positive displacement pump 90 once processing of a batch has been completed. The positive displacement pump 90 can also be used to clean the loop 88 as and when required, with a cleaning liquid fed through the inlet pipe 96.

Figure 8:
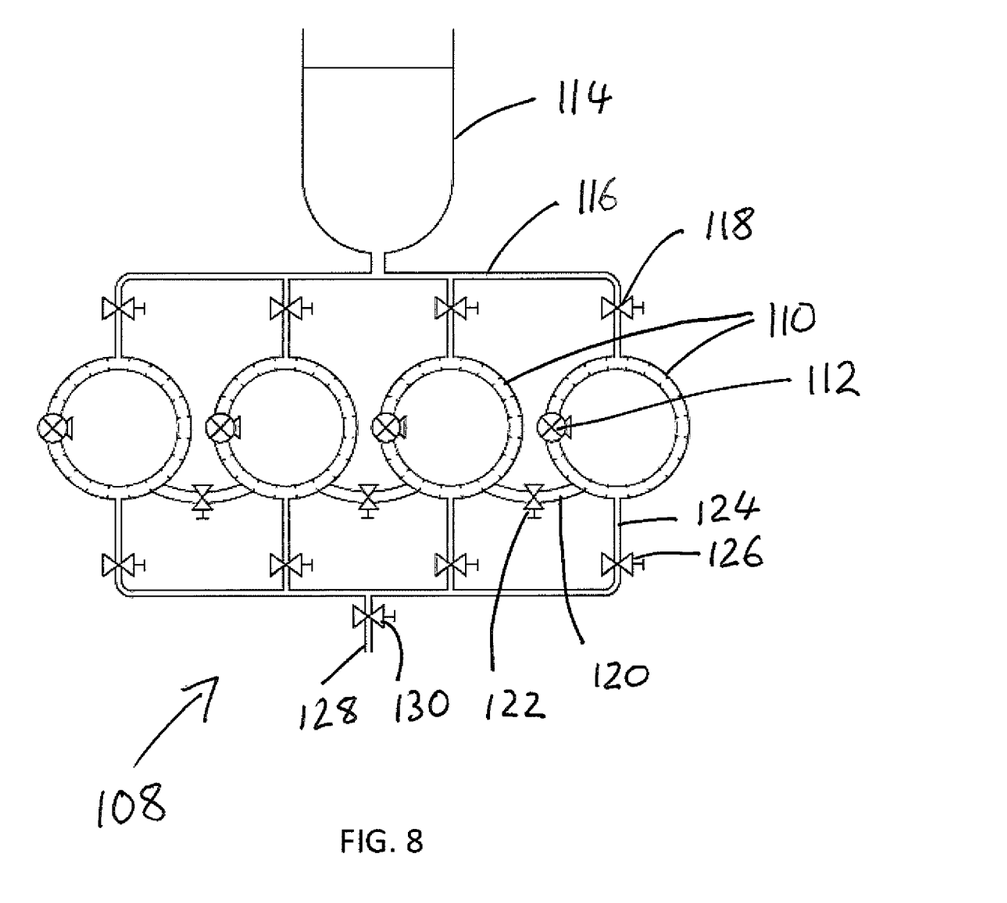
FIG. 8 is a similar view to FIG. 1 but of a sixth liquid process assembly according to the invention.

FIG. 8 shows a sixth assembly 108 usable on a semi continuous system. Here four adjacent circular loops 110 are provided each with a positive displacement pump 112. As shown a feed vessel 114 is located above the loops 110, and could be agitated, pressurised or vented. Pipework 116 extends from the feed vessel 114 to an upper part respectively of each loop 110 to provide inlets to each loop 110 through respective valves 118. Each loop 110 is connected to the adjacent loop or loops 110 via branches 120 controlled by valves 122 which permit material to pass sequentially through the different loops 110 if required.

An outlet 124 is provided at the lower end of each loop 110, with the outlets 124 provided with respective valves 126. The outlets 120 interconnect to a main outlet pipe 128 with a further valve 130, for processed material.

In use the loops 110 could all be operated simultaneously with a required residence time. Alternatively, the loops 110 can start at different times, to permit one loop 110 to be emptied and filled whilst processing in the others is continuing. A multi stage arrangement could be provided where material enters for instance the right hand loop 110 then after a first processing stage material is fed into the next loop 110, and the right hand loop 110 is then refilled. Material could proceed sequentially through all four loops 110 if required in such a multi stage process. Alternatively, material could be perhaps passed through just a selected pair of the loops 110. Additional or alternative feed vessels could also be provided and connected to each loop 110.

Figure 9:
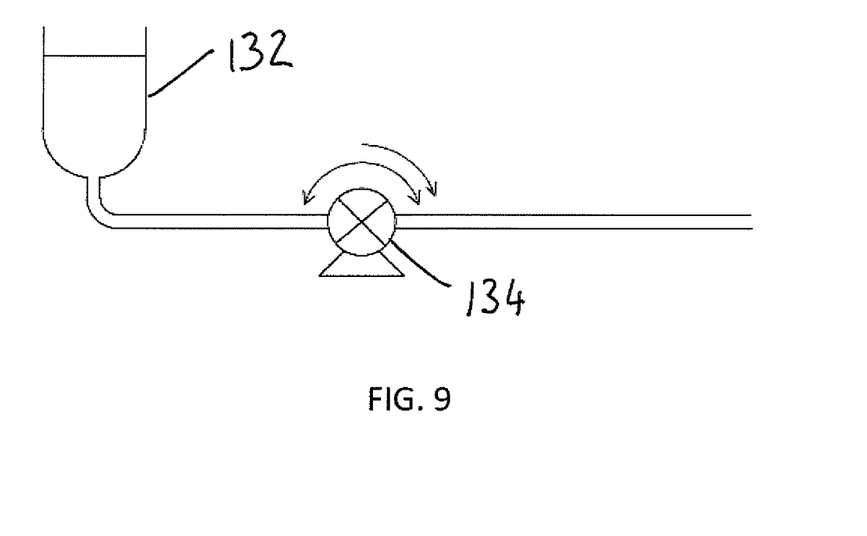
FIG. 9 is a diagrammatic side view of an assembly according to the invention in a cleaning mode.

The invention also provides arrangements for cleaning liquid process assemblies. In FIG. 9 a simple arrangement is shown with a feed vessel 132 leading to a positive displacement pump 134 which enables liquid to be reciprocally moved through the pipework to cause cleaning without the large volume of liquids which would be required if liquid is essentially just flushed or pumped through the assembly.

Figure 10:
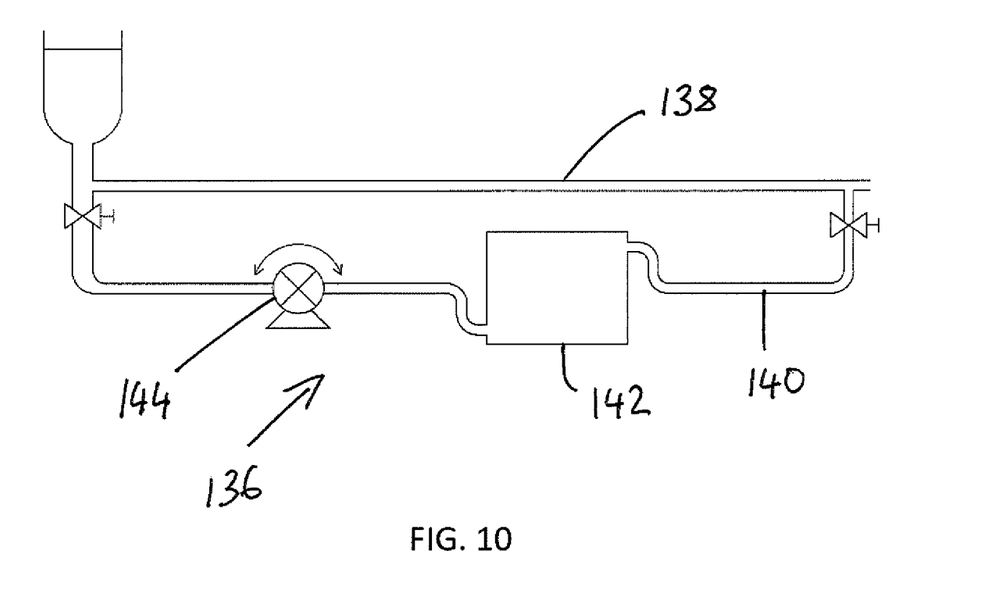
FIG. 10 is a similar view to FIG. 1 of a cleaning apparatus according to the invention.

In FIG. 10 an arrangement 136 is shown which could for instance be permanently located in place across a process line 138, or could be removably connectable for instance to different assemblies. The arrangement 136 here comprises a loop 140 with a reservoir 142 for cleaning liquid and a positive displacement pump 144 for reciprocally moving liquid. Cleaning liquid from the reservoir 142 could be reciprocally moved in a loop through the process line 138 when cleaning is required.

As indicated the arrangement could be selectively connected across the process line 138 with appropriate connections, or could be permanently located in place. With selective connections, the arrangement 136 could be used for cleaning a number of different process lines. In some instances it may not be required to have a reservoir contained within the loop 140.

There are thus described liquid process assemblies and methods of using them which provide for a number of advantages relative to previous arrangements. The rotary reciprocal pump provides for long term reliable and controllable reciprocal pumping in alternating directions as required. With a contactless drive as described, this removes the requirement for any mechanical seal between the drive and pump interior, thereby greatly reducing the chances of any leakage from the pump.

As indicated this arrangement readily provides for cleaning of such arrangements, but with the use of significantly reduced amounts of cleaning liquid relative to conventional arrangements.

As indicated cleaning arrangements could be provided, which could be selectively locatable in position, and for instance the same arrangement could be used to clean a number of different assemblies.

It is to be realised that a wide range of modifications may be made, and any combination of the above described features or other features can be used. The pump may take a different form, and for instance it may be possible to use a diaphragm pump. The pipework may have a different configuration. The vessels may be differently arranged and/or may include additional or different features.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A liquid process assembly for at least one of a continuous reaction and a continuous crystallisation, the assembly including a length of pipework, and a reversible pump for selectively reciprocally moving liquid through the pipework wherein the reversible pump is a positive displacement replacement rotary pump, wherein the pump is controlled by a servo motor and wherein the pump has a magnetic drive located on the exterior of the pump, and wherein one or more liquid level sensors are provided in the assembly, and the liquid level sensor or sensors are connected to a controller such that the reciprocal movement of the pump can be varied in response to the detected liquid levels, and wherein one or more pressure sensors are provided in the assembly, and the pressure sensor or sensors are connected to the controller such that the reciprocal movement of the pump can be varied in response to the detected pressure levels.

2. The assembly of claim 1, wherein the assembly includes a vessel for liquid connected to the pipework.

3. The assembly of claim 2, wherein the vessel is a feed vessel.

4. The assembly of claim 1, wherein the assembly includes a plurality of vessels, each vessel being configured to operate with a positive displacement pump.

5. The assembly of claim 4, wherein each pump includes a controller, the controller being operable to reciprocate flow through the pump.

6. The assembly of claim 4, wherein at least one pump oscillates/reciprocates its flow and at least one other pump does not oscillate/reciprocate its flow.

7. The assembly of claim 1, wherein the liquid process assembly is arranged such that the liquid process assembly can be selectively pressurised.

8. The assembly of claim 1, wherein one or more level devices are provided in the assembly, the one or more level devices being configured to detect changes in the liquid level.

9. The assembly of claim 2, wherein the vessel includes an impellor to substantially prevent crystallisation or settling out within the vessel.

10. The assembly of claim 2, wherein the vessel is a feed vessel, and includes an inlet for process liquid.

11. The assembly of claim 2, wherein an inlet is provided downstream of the vessel, the inlet being connected to a feed pump, the feed pump being connected to a feed supply of material.

12. The assembly of claim 11, wherein the vessel includes a vent, the vent being located on an opposite side to the inlet.

13. The assembly of claim 2, wherein an inlet is provided upstream of the vessel, the inlet being connected to a feed pump, the feed pump being connected to a feed supply of material.

14. The assembly of claim 1, wherein an end of the pipework is closed, and a pressure relief valve is provided on the end of the pipework.

15. The assembly of claim 1, wherein the pipework is in the form of a closed circular loop.

16. The assembly of any of claim 1, wherein the pipework includes two or more circular loops, the two or more circular loops being joined, such that liquid may flow therethrough.

17. The assembly of claim 1, wherein the assembly is in the form of a continuous chemical reactor.

18. The assembly of claim 1, wherein the assembly is in the form of a continuous crystalliser.

19. A method of carrying out a liquid process, wherein the liquid process is at least one of a continuous reaction and a continuous crystallisation, the method including using a liquid process assembly for at least one of a continuous reaction and a continuous crystallisation, the assembly including a length of pipework, and a reversible pump for selectively reciprocally moving liquid through the pipework wherein the reversible pump is a positive displacement replacement rotary pump, wherein the pump is controlled by a servo motor and wherein the pump has a magnetic drive located on the exterior of the pump, and wherein one or more liquid level sensors are provided in the assembly, and the liquid level sensor or sensors are connected to a controller such that the reciprocal movement of the pump can be varied in response to the detected liquid levels, and wherein one or more pressure sensors are provided in the assembly, and the pressure sensor or sensors are connected to the controller such that the reciprocal movement of the pump can be varied in response to the detected pressure levels, and reciprocally moving the liquid in the pipework.

20. The method of claim 19, wherein the reciprocal pumping of the liquid is selectively biased to be greater in a direction away from an inlet, such that a continuous process is carried out, with additional liquid being supplied into an accumulator vessel.

21. The method of claim 19, wherein the assembly is configured such that in response to signals from one or more liquid level sensors, the pumping is biased in either direction so as to provide a required liquid level in the assembly either side of the pump.

* * * * *